United States Patent Office 3,796,571

Patented Mar. 12, 1974

3,796,571

PROCESS FOR THE PREPARATION OF POLYETHYLENE TRANSPARENCIES FOR USE IN PHOTOREPRODUCTION

Frank Lerman, Cincinnati, Ohio, assignor to National Distillers and Chemical Corporation, New York, N.Y.

No Drawing. Continuation-in-part of abandoned application Ser. No. 63,950, Aug. 14, 1970. This application Dec. 1, 1972, Ser. No. 311,173

Int. Cl. G03g *13/14*

U.S. Cl. 96—1.4 6 Claims

ABSTRACT OF THE DISCLOSURE

A process for preparing polyethylene transparencies useful for further photoreproduction, e.g., in photogravure, lithographic, or offset techniques. The transparencies are prepared by transfer of fixed polyethylene images formed xerographically, for example, to polyethylene film layers juxtaposed therewith. The transfer is effected by subjecting the juxtaposed layers to heat and/or pressure.

REFERENCE TO RELATED APPLICATION

This application is a continuation-in-part of copending application Ser. No. 63,950 filed Aug. 14, 1970, now abandoned. The aforesaid application discloses techniques for the preparation of transparencies on polyethylene film substrates which are suitable for use in photoreproduction and which are prepared by (1) the transfer to such substrates of fixed polyethylene images, (2) the transfer thereto of textured impressions of the non-imaged portions of an original, or (3) the transfer of a releasable layer having a suitable image formed therein. Each such technique is incorporated by reference herein; the first such technique is more fully described and claimed herein.

BACKGROUND OF THE INVENTION

This invention relates to a process for the preparation of polyethylene transparencies from fixed polyethylene images such as may be formed xerographically, which transparencies may thereafter be utilized as masters in photogravure, lithographic or offset-printing operations.

As used herein, the term "transparency" is intended to refer to an image suitable for photoreproduction and incorporating image elements or areas of varying densities, on or in a light-transmissive (including translucent) substrate.

In many photoreproduction processes, a positive or negative transparency bearing the image to be reproduced is required. In conventional black and white photographic printing, prints are made from negative transparencies, the black areas on the print representing the substantially light-transmissive areas of the transparency, intermediate tones representing intermediate densities of the transparency, and the white areas on the print corresponding to high densities on the transparency through which virtually no light passes. Thermographic duplication processes may also employ transparencies as originals, and rely for differentiation of the image-defining areas on the relative proportions of heat radiation transmitted through the transparency. Photogravure, photo-lithographic, and photo-offset processes form printing plates for use in gravure, lithographic and offset-printing by exposing a photosensitive surface through a transparency, and then treating the surface so as to etch, dissolve or otherwise remove or chemically modify the surface in accordance with the light-induced changes created therein by the exposure. The varying relief or intaglio, or oleophilic and hydrophilic, areas of the plates thus produced are capable upon printing, of duplicating the image on the original transparency.

All the preceding photoreproduction processes require an original transparency which may be produced photographically. In many cases, however, the material to be duplicated is in the form of a print, design or decoration in or on an opaque substrate, such as paper, metal, fabric or plastic. Duplication of such an original photographically requires that a negative be taken by a camera, the image developed, and the film processed, all of which is time-consuming, and requires cumbersome equipment.

Duplication procedures are also available which are capable of preparing reproductions of prints, decorations, designs or other images on a substrate by electrostatic (xerographic) or thermostatic (thermographic) printing. These procedures, however, generally produce a copy on an opaque substrate, which is not suitable for use in reproduction processes requiring an original transparency.

Procedures have also been described in the patent literature for forming transparencies by transfer from originals produced xerographically. Such techniques are disclosed, for example, in Carlson U.S. Pat. No. 2,990,278 granted June 27, 1961, and Mayer U.S. Pat. No. 3,275,436 granted Sept. 27, 1966. The techniques described in the Mayer patent may be carried out employing polyethylene-coated transfer sheets such as described in Van Dorn U.S. Pat. No. 2,855,324 granted Oct. 7, 1958.

The Carlson, Mayer and Van Dorn patents disclose the xerographic formation of an electrostatic powder image, the subsequent transfer of such image to a transfer layer and, optionally, the application of an additional material to the non-image portions of the transfer layer. Carlson teaches that the transfer layer is preferably of such a composition that it does not mechanically bond to the electrostatic powder image but rather forms only an intermediate support for the image prior to transfer to a third, and final, substrate therefor. Mayer, on the other hand, discloses that the transfer layer may adhesively receive the electrostatic powder image and that an additional film material may thereafter be adhered to such layer in the non-image portions defined by the electrostatic powder image thereon. Van Dorn describes the use of, for example, a polyethylene-coated transfer layer and indicates that, alternatively, the electrostatic powder image transferred to such layer may be heat-fixed thereon.

Each of the preceding techniques is directed to the application of an unfixed (impermanent) electrostatic powder image layer, which may be followed by further manipulation, e.g., by transfer to yet another receiving layer—Carlson, or by the application of a coating to the non-imaged portions thereof—Mayer, prior to fixing the final image. As acknowledged by Carlson, such manipulations may result in smudging and/or offsetting of the electrostatic powder image during the transfer operation as well as in any subsequent manipulations thereof. The clarity of the final image desired for photoreproductive purposes may thus be substantially impaired.

It is a principal object of the present invention to provide a relatively simple and yet precise technique for effecting the transfer of images formed, for example, by xerography, which technique is not subject to image smudging and/or offsetting during its operation, and which provides clear and well-defined transparencies which are quite suitable for subsequent photoreproduction.

SUMMARY OF THE INVENTION

In accordance with the present invention, a process is provided for the preparation of transparencies suitable for use in photoreproduction, which comprises depositing polyethylene particles in an imagewise array on a substrate, heating the polyethylene particles to melt them and then cooling the image layer to provide a fixed polyethylene image thereon. The substrate having the fixed image formed thereon is then juxtaposed with a polyethylene film, and the juxtaposed layers are successively heated and cooled to transfer at least a portion of the fixed polyethylene image to the film and, in turn, fix the transferred image thereon. Finally, the polyethylene film is stripped from the original substrate, a fixed positive transparency suitable for use in photoreproduction thereby being formed on the film.

The original polyethylene image utilized in the practice of the present invention may be formed on any desirable substrate to which it can be fixed by sequential heating and cooling in accordance herewith. Preferably, the image is applied to the substrate xerographically, providing an electrostatic polyethylene powder image thereon. The image layer is heated to melt (fuse) the particulate polyethylene powders, and is thereafter cooled to fix the image in a manner well known in the xerographic art. By thus fixing the polyethylene original prior to effecting the transfer operation substantially all smudging or offsetting is avoided in the process.

The particulate polyethylene image-forming material may comprise either a high or low density polyethylene and may be utilized alone or admixed with a variety of additives. Additives so useful include coloring agents, such as any suitable pigment, dye, opacifier, brightener or fluorescent agent for polyethylene. The coloring agent should, preferably, be heat- and light-stable, should not leave or migrate from the polyethylene resin during or after its transfer to the polyethylene film, and should not react deleteriously. Examples of suitable coloring agents include carbon black, phthalocyanine blue, fluorescent pigments or dyes, phthalocyanine green, cadmium sulfide, cadmium sulfide-selenide, titanium dioxide, calcined iron oxide, chromic oxide, and zinc oxide. One process for preparing colored thermoplastic polymer powders which are useful in the practice of the present invention is described, for example, in U.S. Pat. No. 3,449,291.

PREFERRED EMBODIMENTS OF THE INVENTION

As indicated hereinabove, the polyethylene image is initially formed on any suitable substrate upon which it may be fixed as aforesaid. Preferably, the substrate utilized may have a smooth, untextured surface, in order not to impart any texture to the polyethylene image formed thereon and subsequently transferred therefrom. Alternatively, when it is desired to form transparencies having textured or otherwise decorated backgrounds, an appropriately decorated substrate may be utilized.

Substrates so utilized may comprise paper; wood; metal, such as stainless steel, aluminum, chromium-plated steel, nickel-plated steel or cadmium-plated steel; stone; fabrics, both woven and nonwoven, made of natural or synthetic fibrous material, or blends thereof; leather; ceramics and porcelain; glass; and opaque or translucent plastic materials such as nylon, Teflon (polytetrafluoroethylene), polycarbonates, polystyrene; synthetic rubbers or other elastomeric materials; or cellophane or regenerated cellulose.

The polyethylene image applied to one of the indicated substrates, for example, xerographically, may be fixed by successive heat-fusing and cooling in known manner. Utilizing a smooth, sized, untextured paper substrate, for example, the polyethylene image may suitably be heated to temperatures of from about 110° to 150° C. to melt or fuse the polyethylene particles, and thereafter cooled to from about 90° to 25° C. to solidify and fix the image thereon. Preferably, the successive heating and cooling operations are carried out in rapid succession, the image being fused within about 1–20 seconds, and thereafter fixed by cooling as aforesaid within a further 1 to 30 seconds. In this manner, a fixed, non-smudging image is formed on the initial substrate.

The polyethylene film to which such image is to be transferred may be of any suitable grade or thickness. The use of films having guages of from about 1 to 5 mils and prepared from resins having densities varying from about 0.913 to 0.96 is particularly suitable. Any polyethylene film materials may, however, be utilized so long as, upon juxtaposition with the initial image and the application of heat and/or pressure thereto, both the film material and the image material will be softened and adhered to one another to effect the desired transfer of the initial image to the film layer.

In effecting the transfer it is desirable to press the initial image and the polyethylene transfer film together at temperatures of from about 110° to 175° C. and with the application of pressures which may suitably vary from about 2 to 50 p.s.i.g. Such heat and/or pressure may be applied in any suitable manner, e.g., manually, or by pressing the same between suitable platens or pressure rolls. When the image and film layers are thus juxtaposed they may be sandwiched between a pair of block-resistant film layers constituted, for example, of Mylar polyester film, to facilitate, the transfer operation without blocking.

The juxtaposed layers are thereafter cooled to temperatures of from about 90° to 25° C., preferably within about 30 seconds of the initial application of heat and/or pressure, to complete the transfer to, and fixation of, at least a portion of the image areas of the original on the polyethylene film transfer layer. The two layers are thereafter stripped apart, leaving at least a portion of the image material tightly anchored to the transparent polyethylene transfer or carrier film and thereby providing the final transparency suitable for use in photoreproduction.

The polyethylene transfer film may, if desired, be laminated to a further transparent carrier film whereby to sandwich the polyethylene image between the two films and thus protect it from damage during further use. The second carrier film may be bonded to the completed transparency in any desired manner.

The following examples illustrate preferred embodiments of the process of the present invention. It will be understood that the techniques described therein are illustrative only, and should not be construed in a limiting sense.

EXAMPLE 1

Transfer of a fixed polyethylene image from glass

A stencil was mounted on a 325-mesh stainless steel screen, and the stencil screen was placed in close proximity to the hot surface of a glass bottle, screen side towards the bottle. The bottle surface was heated to 125° C. A fusible blue-pigmented polyethylene powder having an average particle size of about 30 microns, and containing 0.5% by weight colloidal silica (Cab-O-Sil) to increase the flowability of the powder, was brushed through the stencil screen, and was deposited in a pattern corresponding to the pattern of the stencil. Upon contacting the hot surface of the frosted glass bottle, the particles of the polyethylene powder melted. Enough particles were applied to form an image layer which, upon cooling, adhered to the surface of the bottle defining a fixed image.

A polyethylene film was then applied over the image layer, and the film and bottle were heated by a heat pump for ten minutes, thereby transferring the polyethylene image to the polyethylene film.

Upon cooling, the polyethylene film with the polyethylene image bonded thereto was stripped off the surface of the glass bottle. The polyethylene image adhered to the polyethylene film, and the resulting transparency was useful for photoreproduction.

EXAMPLE 2

Transfer of a fixed polyethylene image from paper

A copy of a printed black-and-white magazine page was reproduced by an electrostatic copier, forming a fixed carbon-pigmented polyethylene toner image on a standard bond paper. Using a heat lamp, the imaged surface of the paper copy thus obtained was transferred to a thin polyethylene film, after which the film was cooled, and then carefully peeled from the paper surface.

Most of the black toner image was thus removed from the portion of the paper adhered to the film, leaving faint grey markings on the paper. The image had transferred to the polyethylene film, giving clear undistorted dark markings on the film. The portions of the polyethylene film to which the imaged areas of the copy paper had transferred remained flat and undistorted after cooling and peeling. The portions of the film to which unprinted areas of the copy paper had bonded became somewhat translucent due to the impression made by the paper texture on the transparent film. It is preferred to utilize a smooth, sizd paper to minimize the texture impression or transfer to the transparent carrier film and thereby retain the transparency of the film contrasting with the opaque printed image on the paper for better photoreproduction. A clear, legible and undistorted polyethylene image was thus transferred to and formed on the polyethylene film.

EXAMPLE 3

Transfer of a fixed polyethylene image from paper, utilizing composite transfer assembly Copies of electrostatic test prints formed on regular bond paper with carbon-pigmented polyethylene powder and Xerox carrier, by means of a conventional electrostatic-type office copier were prepared as follows:

The test prints, bearing fixed black-and-white reproductions of a magazine page thereon, were brought in contact with sections of 1 and 5 mil polyethylene films, and the juxtaposed sheets were then sandwiched between two larger sheets of polyethylene terephthalate (Mylar) film. The respective sandwiches were passed from four to twelve times through the heated rolls of a 6-inch diameter, 12-inch wide, two-roll differential speed Thropp mill. Each roll was set to rotate at 15 r.p.m., and was heated to a controlled temperature of 350° F. The nip setting was at a minimum. After each run, the Mylar sheets (principally utilized to protect the polyethylene film from sticking to the rolls) were removed, and the polyethylene film was carefully peeled from the paper.

Good image transfer from the paper to the film was obtained. A good portion of the fixed polyethylene toner was transferred to and fused onto the polyethylene film, producing a legible, undistorted black print.

Various changes may be made in the preferred embodiments described hereinabove without departing from the scope of the present invention. Accordingly, the preceding description should be interpreted as illustrative only and not in a limiting sense.

I claim:

1. A process for the preparation of polyethylene transparencies for use in photoreproduction, which comprises:

(a) depositing polyethylene particles in an imagewise array on a substrate to define a polyethylene image;
(b) heating the polyethylene particles to melt the same;
(c) cooling the image layer to provide a fixed polyethylene image thereon;
(d) juxtaposing the fixed polyethylene image with a polyethylene film;
(e) heating the juxtaposed polyethylene image and film layers to a temperature sufficient to soften and transfer at least a portion of the fixed polyethylene image to the film;
(f) cooling the juxtaposed layers to fix the transferred image on said film; and
(g) stripping the thus imaged polyethylene film from said substrate to form a fixed polyethylene transparency suitable for use in photoreproduction.

2. The process of claim 1, wherein the polyethylene particles are pigmented and are xerographically deposited in the imagewise array on said substrate.

3. The process of claim 1, wherein said substrate is paper.

4. The process of claim 1, wherein said substrate is glass.

5. The process of claim 1, wherein the polyethylene image and film layers are juxtaposed by sandwiching the same between a pair of block-resistant film layers, and the resulting sandwich is subjected to heat and pressure to effect transfer of the fixed polyethylene image to said film without blocking.

6. The process of claim 5, wherein the block-resistant film layers are constituted of polyester sheets.

References Cited

UNITED STATES PATENTS

| | | | |
|---|---|---|---|
| 3,275,436 | 9/1966 | Mayes | 96—1 |
| 2,990,278 | 6/1961 | Carlson | 96—1 |
| 2,855,324 | 10/1958 | Van Dorn | 117—25 |

NORMAN G. TORCHIN, Primary Examiner

J. P. BRAMMER, Assistant Examiner

U.S. Cl. X.R.

264—245, 322; 117—17.5, 21